(12) United States Patent
Ookuma et al.

(10) Patent No.: US 8,542,704 B2
(45) Date of Patent: Sep. 24, 2013

(54) PACKET JOINING METHOD, PROGRAM, AND APPARATUS

(75) Inventors: Takahiro Ookuma, Toyko (JP); Satoru Yamano, Tokyo (JP)

(73) Assignee: NEC Corporation, Tokyo (JP)

( * ) Notice: Subject to any disclaimer, the term of this patent is extended or adjusted under 35 U.S.C. 154(b) by 440 days.

(21) Appl. No.: 11/606,991

(22) Filed: Dec. 1, 2006

(65) Prior Publication Data
US 2007/0127399 A1    Jun. 7, 2007

(30) Foreign Application Priority Data
Dec. 5, 2005   (JP) .................................. 351331/2005

(51) Int. Cl.
*H04J 3/24*    (2006.01)
(52) U.S. Cl.
USPC ........................................................ 370/473
(58) Field of Classification Search
USPC ............. 370/464, 465, 473, 474, 310, 312, 370/431, 432, 254, 255, 351, 352, 353, 354; 709/230, 231
See application file for complete search history.

(56) References Cited

U.S. PATENT DOCUMENTS

| 6,266,334 | B1 * | 7/2001 | Duckwall | 370/397 |
|---|---|---|---|---|
| 6,721,334 | B1 * | 4/2004 | Ketcham | 370/473 |
| 2002/0191573 | A1 | 12/2002 | Whitehill et al. | |
| 2003/0002460 | A1 * | 1/2003 | English | 370/331 |
| 2004/0023634 | A1 * | 2/2004 | Jeong et al. | 455/403 |
| 2005/0025163 | A1 | 2/2005 | Christie, IV | |
| 2005/0030965 | A1 * | 2/2005 | Aoki et al. | 370/432 |
| 2005/0122960 | A1 * | 6/2005 | Khan | 370/352 |
| 2005/0259623 | A1 * | 11/2005 | Garudadri et al. | 370/335 |
| 2006/0067324 | A1 * | 3/2006 | Kim et al. | 370/395.2 |
| 2006/0089964 | A1 * | 4/2006 | Pandey et al. | 709/203 |
| 2006/0146745 | A1 * | 7/2006 | Cai et al. | 370/328 |
| 2006/0182024 | A1 * | 8/2006 | Zhao et al. | 370/229 |
| 2006/0198324 | A1 * | 9/2006 | Nerses et al. | 370/260 |
| 2007/0104107 | A1 * | 5/2007 | Alapuranen | 370/238 |

FOREIGN PATENT DOCUMENTS

| JP | 2004-247778 | 9/2004 |
|---|---|---|
| JP | 2004-531971 | 10/2004 |
| JP | 2005-102340 | 4/2005 |

OTHER PUBLICATIONS

Chinese Office Action with English-Language translation dated Mar. 20, 2009.

* cited by examiner

*Primary Examiner* — Obaidul Huq
(74) *Attorney, Agent, or Firm* — McGinn IP Law Group, PLLC

(57) ABSTRACT

There is provided a packet joining method, program, and apparatus with an increased wireless utilization efficiency and a reduced packet delay. The packet joining method includes a step of performing Neighbor Discovery within a range reachable in one hop to detect neighboring audio terminals which are connectable over short-range radio and acquiring call information including audio session information such as whether the detected audio terminals are busy with respective calls and packetization period information and wireless transmission rate information, a step of selecting one as a joining destination from the list of detected connectable audio terminals on the basis of the call information by the criteria that occupancy time of wireless transmission becomes short and that a packet delay at the time of joining becomes small, a step of requesting packet joining of the selected audio terminal as the joining destination, and a step in which an audio terminal as a joining source starts a voice call upon receipt of a positive response from the audio terminal as the joining destination in response to the request for joining.

16 Claims, 18 Drawing Sheets

* FOR EXAMPLE, REFERENCE NUMERAL 101-1 DENOTES PACKET SENT FIRST BY AUDIO TERMINAL 101. SIMILARLY, REFERENCE NUMERAL 103-1 DENOTES PACKET SENT FIRST BY AUDIO TERMINAL 103.

PROCESSING OF AUDIO TERMINAL AS JOINING DESTINATION

TERMINAL AS JOINING DESTINATION

PROCESSING OF JOINING DESTINATION

FIG. 17

```
AUDIO TERMINAL 301
CALL STATUS : BUSY WITH CALL
TRANSMISSION RATE : 1 Mbps
PACKETIZATION PERIOD : 10 ms
```

FIG. 18

```
AUDIO TERMINAL 302
CALL STATUS : BUSY WITH CALL
TRANSMISSION RATE : 11 Mbps
PACKETIZATION PERIOD : 20 ms
```

FIG. 19

```
AUDIO TERMINAL 303
CALL STATUS : BUSY WITH CALL
TRANSMISSION RATE : 11 Mbps
PACKETIZATION PERIOD : 30 ms
```

F I G. 20
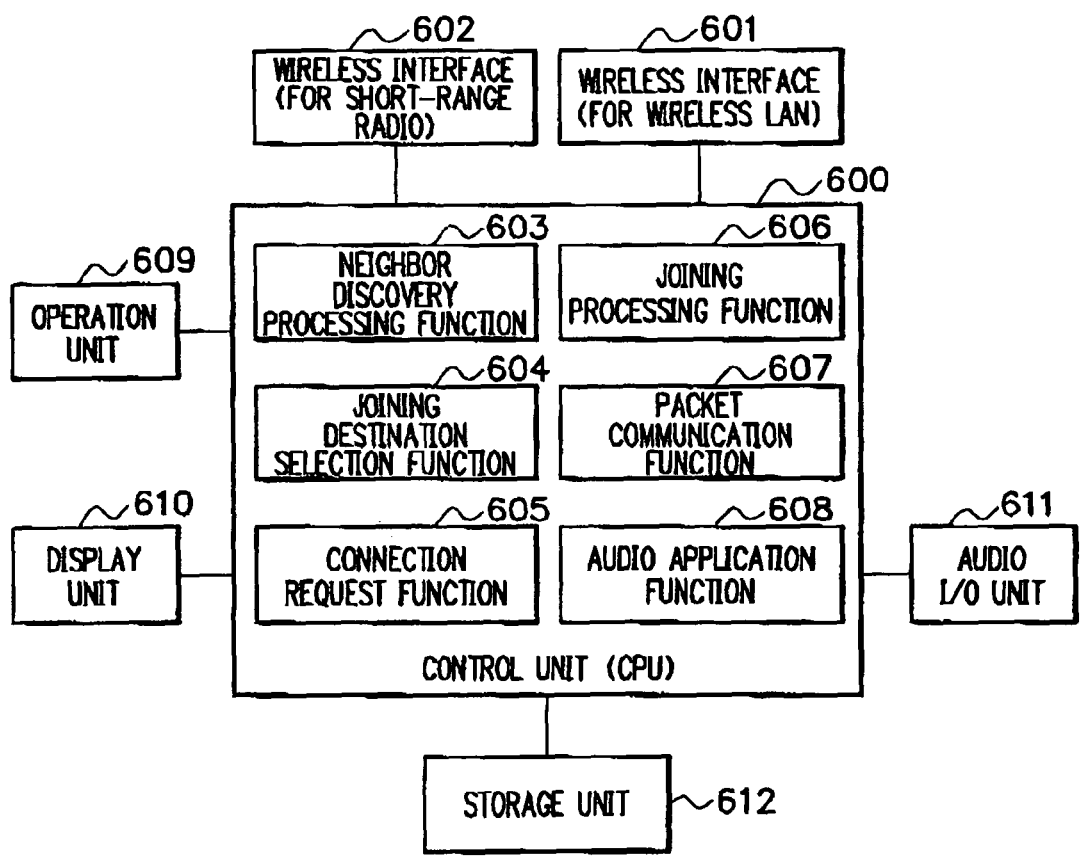

PACKET JOINING METHOD, PROGRAM, AND APPARATUS

BACKGROUND OF THE INVENTION

The present invention relates to a packet joining method and, more particularly, to a packet joining method, program, and apparatus that are designed to use VoIP (Voice over Internet Protocol) in a hotspot ("HOTSPOT" is a registered trademark) system.

DESCRIPTION OF RELATED ART

A packet joining method of the present invention is applied to VoIP in a hotspot system expected to use an audio terminal having two interfaces, a wireless LAN interface for connection to an access point and a short-range wireless interface for connection between audio terminals.

A hotspot system is a system which provides a wireless (LAN) service area where an Internet connection service is available to an unspecified number of users by setting up an access point for a wireless LAN, Bluetooth, or the like in a public place such as in a station or on the street. When VoIP is used in a hotspot system, a resource manager which manages a radio bandwidth is set up for the purpose of maintaining audio quality.

A resource manager keeps track of the status of use of a radio bandwidth for a wireless LAN and determines whether to permit connection in response to a request for connection of a call from a user. When permission for connection of a new call is projected to degrade not only the audio quality of the new call but also those of existing calls, such as in a situation where the radio bandwidth has no room, the resource manager denies a request for connection of a new call and treats it as a call loss. However, if a call loss frequently occurs, the overall service to users lowers. Thus, there is a demand for a method of reducing the occurrence of call losses.

As a method of reducing the occurrence of call losses, there is available a method of joining packets. Particularly in a wireless LAN, the occupancy time of wireless transmission by overhead portions such as carrier sense and preambles is about five times that of packet portions (IEEE802.11b). Accordingly, shortening of the occupancy time of wireless transmission by overhead portions by packet joining is effective in reducing call losses.

Examples of a packet joining method in which an audio terminal combines and sends a plurality of packets generated by the audio terminal itself include ones described below.

The first one is a method in which an audio terminal combines and sends voice packets together which are generated by an audio terminal and obtained by packetization at intervals of, e.g., 20 ms. This method can reduce the number of times packets are transmitted and thus has the effect of shortening occupancy time of wireless transmission and reducing the occurrence of call losses.

The second method is described in Japanese Patent Application Laid-Open No. 2005-102340 where a reception acknowledgement signal of a downstream packet is joined to an upstream packet. This method can shorten the wireless occupancy time of a reception acknowledgement signal and thus have the effect of reducing the occurrence of call losses.

Additionally, there is available a method in which an audio terminal sends a packet to a neighboring audio terminal using short range radio, and the audio terminal having received the packet joins the received packet to a sending packet and sends the joined packet. If there are a plurality of audio terminals in the neighborhood, a method of selecting an audio terminal as a joining destination is necessary. A conventional method is described in National Publication of International Patent Application No. 2004-531971. This method is to select a connection destination using as evaluation factors the amount of energy expended and the number of hops.

However, the conventional method does not adopt as a selection factor the call status of a candidate audio terminal for a joining destination. Accordingly, if an attempt is made to connect to an audio terminal which is not calling, superfluous traffic flows in short-range radio.

The conventional method also does not adopt as a selection factor the wireless transmission rate of a joining candidate audio terminal in a wireless LAN. Accordingly, if a terminal as a joining source connects to an audio terminal with a low transmission rate, occupancy time of wireless transmission becomes longer, thus resulting in an increase in call losses. For example, consider a network as shown in FIG. 1 which comprises an access point 100, a resource manager 50, an audio terminal 1, an audio terminal 2, and an audio terminal 3. Assume that the transmission rate of a wireless LAN interface of the audio terminal 1 is 1 Mbps and that a wireless LAN interface of the audio terminal 2 operates at 11 Mbps. If the audio terminal 3 selects the audio terminal 1 as a terminal as a joining destination, occupancy time of wireless transmission becomes longer than that when the audio terminal 3 selects the audio terminal 2 as the terminal as the joining destination, as shown in FIG. 2. This results in an increase in call losses.

Additionally, the conventional method does not adopt the packetization period of an audio terminal as a candidate for a joining destination as a selection factor. Accordingly, a delay due to waiting for packet transfer which occurs between a terminal which requests packet joining and a terminal which permits joining increases. For example, consider a network shown in FIG. 3 which comprises an access point 200, a resource manager 150, an audio terminal 101, an audio terminal 102, and an audio terminal 103. Assume that the audio terminal 101 uses a packetization period of 50 ms and that the audio terminal 102 and audio terminal 103 use a packetization period of 10 ms. If the audio terminal 103 joins the audio terminal 101, packets sent from the audio terminal 103 to the audio terminal 101 at intervals of 10 ms are sent from the audio terminal 101 to the access point 200 with the packetization period of 50 ms. Accordingly, a packet transfer waiting delay occurs, as shown in FIG. 4.

In packet joining communication of conventional techniques, a voice call status is not taken into consideration at the time of selecting a joining destination. Accordingly, an audio terminal may connect to an audio terminal which is not calling. In this case, there is a problem that unnecessary traffic flows in short-range radio.

Conventional techniques also do not take into consideration a wireless transmission rate at the time of selecting a joining destination. Accordingly, if an audio terminal joins an audio terminal with a low wireless transmission rate, packet transfer time at the time of joining becomes longer, and the utilization efficiency of a radio bandwidth becomes lower, compared with a case where the audio terminal joins an audio terminal with a high wireless transmission rate. Consequently, the bandwidth utilization efficiency of a wireless LAN may decrease.

Additionally, conventional techniques do not take into consideration a packetization period at the time of selecting a joining destination. Accordingly, if a joining source uses a packetization period which is shorter than that of a joining destination, a packet joining waiting delay increases. Consequently, conventional techniques may cause a packet joining waiting delay.

SUMMARY OF THE INVENTION

It is an object of the present invention to solve the above-described problems and provide a packet joining method, program, and apparatus that allow an increase in the utilization efficiency of a radio bandwidth and a reduction in audio delay.

It is another object of the present invention to provide a packet joining method, program, and apparatus that use audio session information such as whether an audio terminal as a joining destination is busy with a call and a packetization period, and a wireless transmission rate information as factors for selecting an audio terminal of a joining destination.

It is still another object of the present invention to provide a packet joining method, program, and apparatus that allow an audio terminal of a joining source to continue communication even when an audio terminal of a joining destination ends communication by packet joining.

A packet joining procedure of the present invention can be roughly divided into four steps as shown in FIG. 5.

The first one is a Neighbor Discovery step in which an audio terminal performs Neighbor Discovery over short-range radio and detects a neighboring audio terminal. The step is a procedure for performing Neighbor Discovery within a range reachable in one hop and detecting neighboring audio terminals which are connectable over short-range radio and at the same time acquiring audio session information such as whether the detected audio terminals are calling, and packetization period information and wireless transmission rate information from the audio terminals as communication information of the audio terminals.

The second one is a joining destination selection step of selecting one as a joining destination from the list of connectable audio terminals detected in the first step. Criteria for selecting the audio terminal as the joining destination are that the audio terminal as the joining destination is busy with a call, that occupancy time of wireless transmission becomes short, and that a packet delay at the time of joining becomes small.

The third one is a joining request step of requesting packet joining of the selected audio terminal as the joining destination. The audio terminal as the joining destination requests to a resource manager for determination whether connection is permitted. The determination result from the resource manager is sent to the audio terminal as the joining source through the audio terminal as the joining destination. Here, information which the audio terminal as the joining source sends to the audio terminal as the joining destination at the time of the request for joining includes audio session attribute information (the type of a codec type and a packetization period) used by the joining source. The audio session attribute information is used by the resource manager to know the packet length of the joining source.

The fourth one is a joining communication step in which the audio terminal as the joining source sends a packet to be joined to another audio terminal as the joining destination upon receipt of an ACK (positive response) in response to the request for joining (request message) and starts a voice call. Note that during the call by joining, the audio terminal as the joining source may make preparations for switching the joining destination from the current audio terminal to another while performing the first and second steps.

BRIEF DESCRIPTION OF THE DRAWINGS

The objects and features of the present invention will become more apparent from the consideration of the following detailed description taken in conjunction with the accompanying drawings, in which:

FIG. 17 is a view for explaining an embodiment of the present invention;

FIG. 18 is a view for explaining an embodiment of the present invention;

FIG. 19 is a view for explaining an embodiment of the present invention; and

FIG. 20 is a view for explaining an embodiment of the present invention.

DESCRIPTION OF THE PREFERRED EMBODIMENTS

The best mode for carrying out the present invention will be explained in detail with reference to the drawings.
(Explanation of Configuration)

Figure 1:
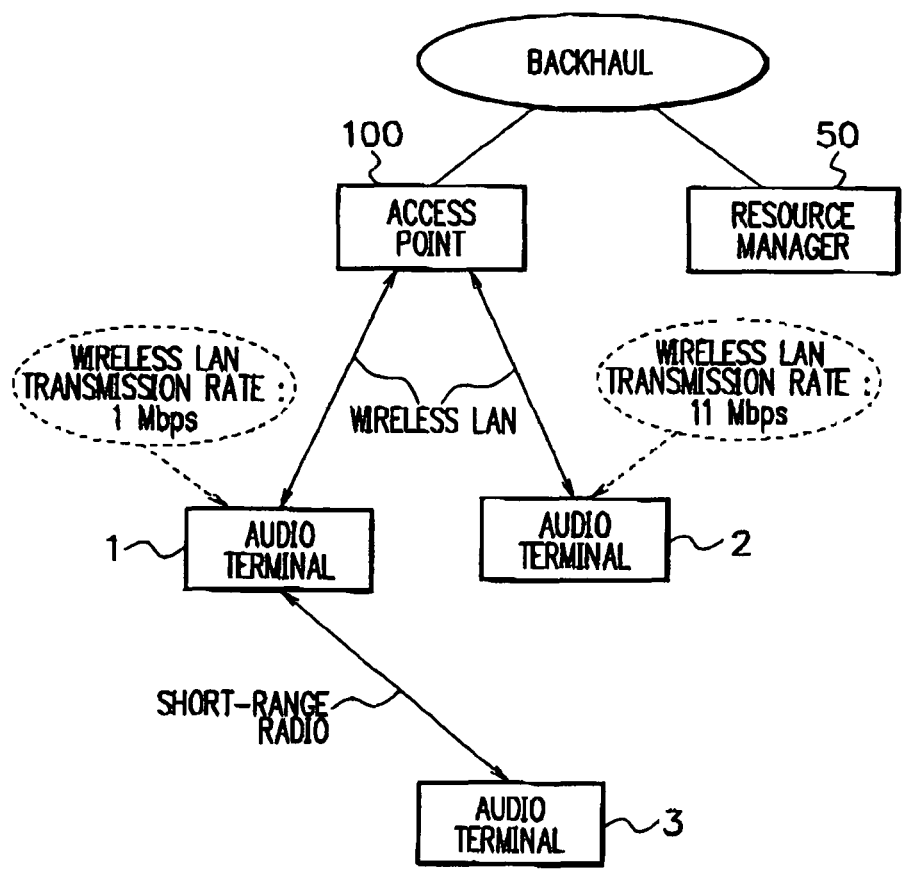
FIG. 1 is a network configuration diagram for explaining the background art.
Figure 2:
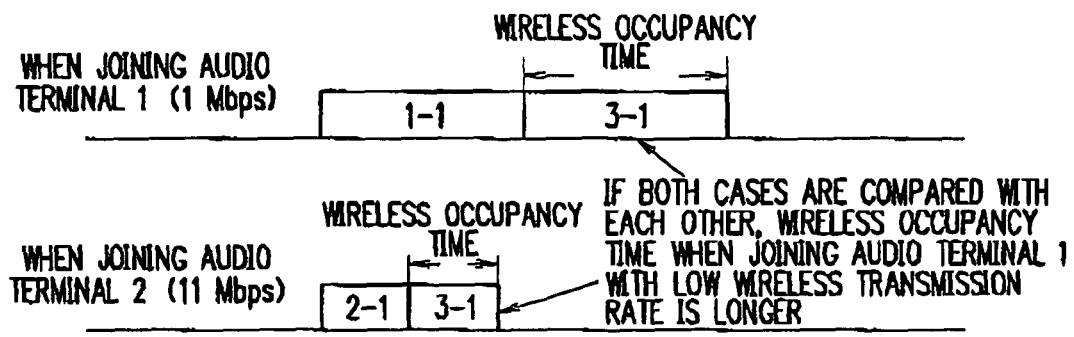
FIG. 2 is a chart for explaining a problem of the background art.
Figure 3:
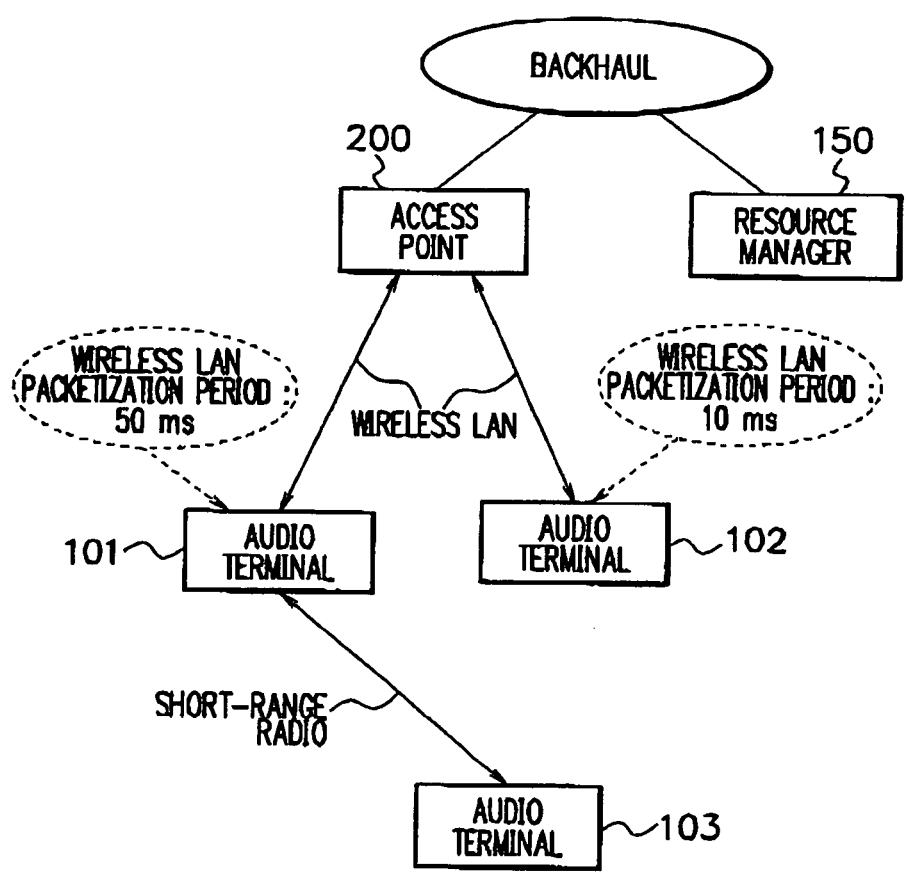
FIG. 3 is a network configuration diagram for explaining the background art.
Figure 4:
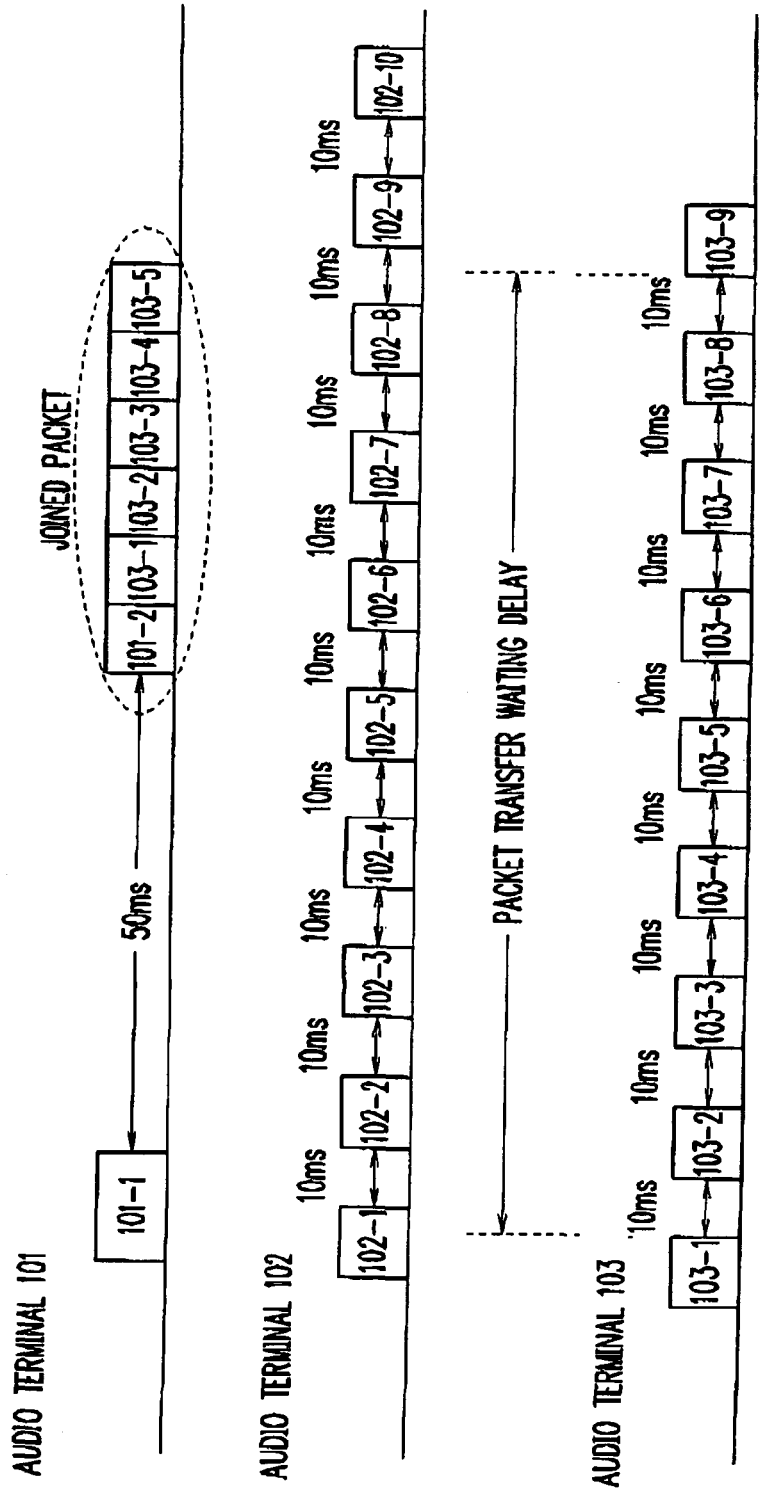
FIG. 4 is a chart for explaining a problem of the background art.
Figure 5:
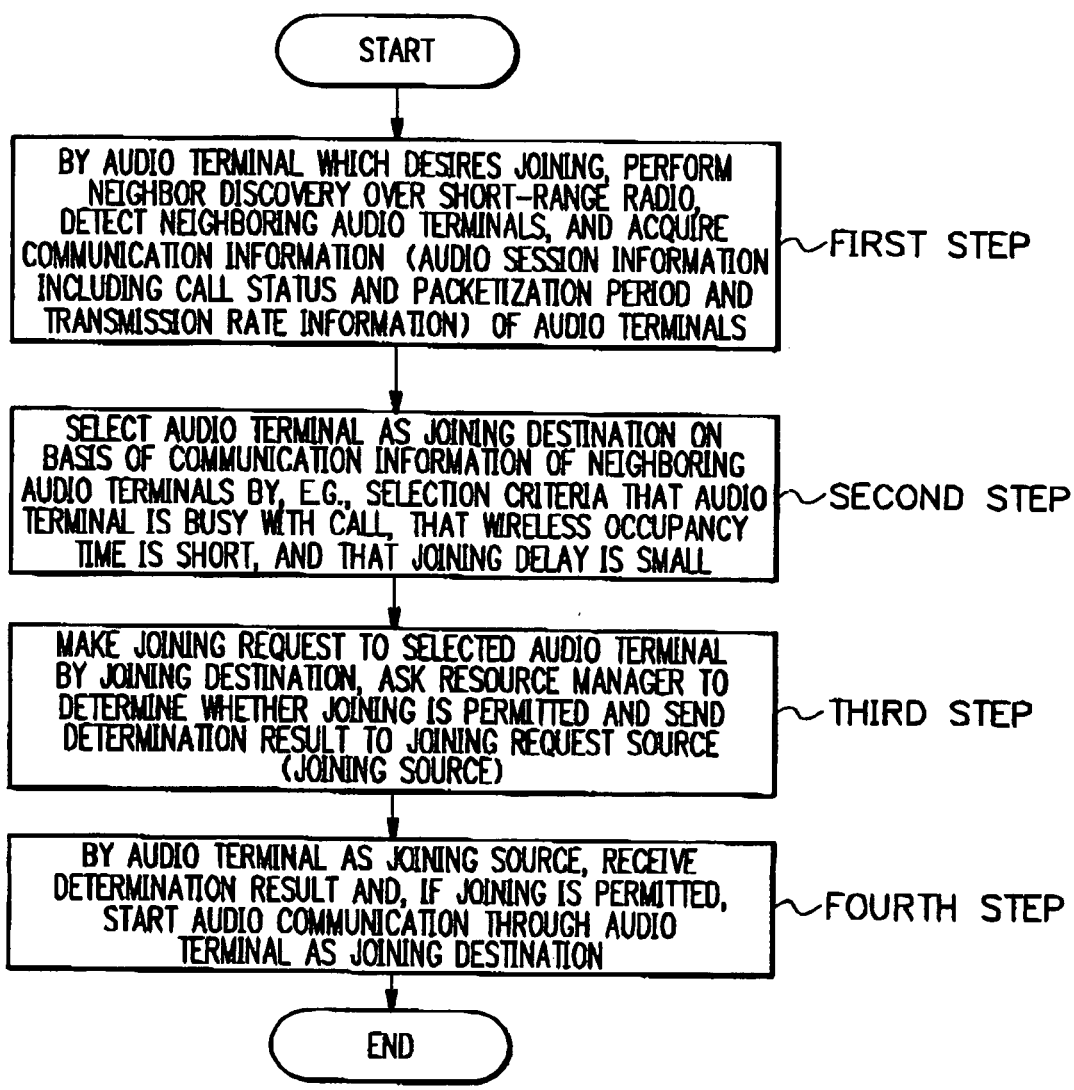
FIG. 5 is a schematic flowchart of a packet joining procedure of the present embodiments.
Figure 6:
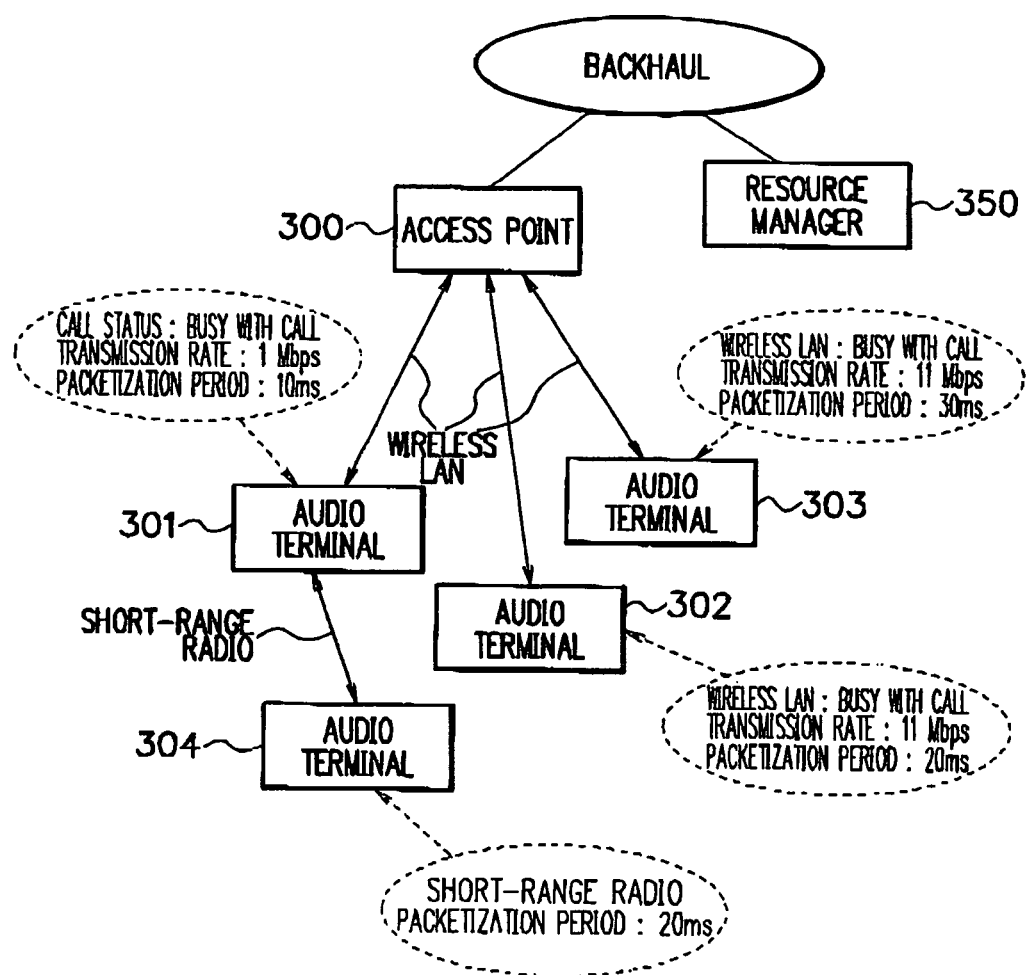
FIG. 6 is a diagram (of the configuration of a network) for explaining the best mode for carrying out the present invention.

FIG. 6 is a diagram showing the configuration of a network of this embodiment. The network comprises an access point 300 which is arranged in a public place such as in a station or on the street and connected to a backhaul of a hotspot system, a resource manager 350 connected to the backhaul, and an audio terminal 301, an audio terminal 302, an audio terminal 303 and an audio terminal 304 connected to the access point 300.

Figure 7:
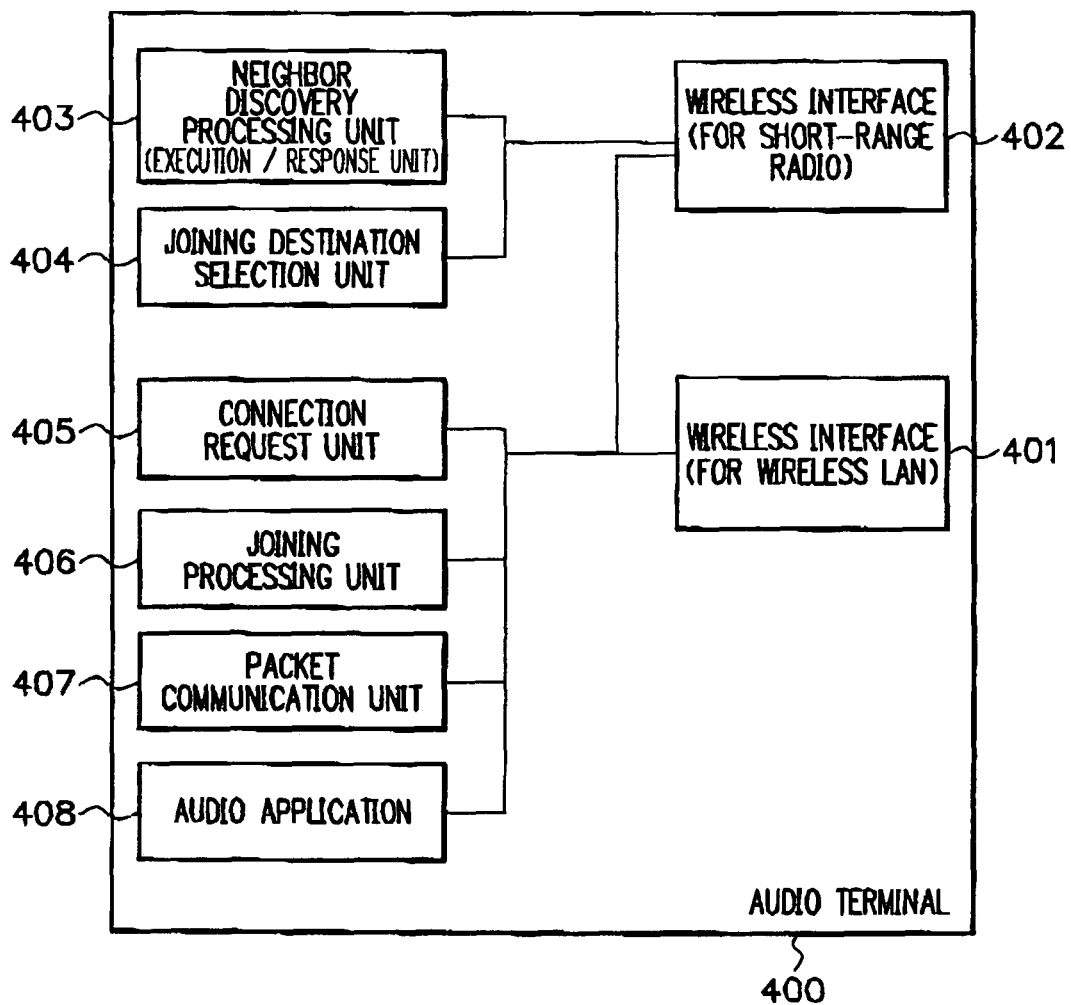
FIG. 7 is a diagram (of the configuration of an audio terminal) for explaining the best mode for carrying out the present invention.

FIG. 7 is a block diagram showing the configuration of an audio terminal of this embodiment. The configuration and functions of an audio terminal 400 will first be explained with reference to FIG. 7.

The audio terminal 400 has a wireless interface (for wireless LANs) 401, a wireless interface (for short-range radio) 402, a Neighbor Discovery processing unit (execution/response unit) 403, a joining destination selection unit 404, a connection request unit 405, a joining processing unit 406, a packet communication unit 407, and an audio application unit 408. The functions and operations of the units will be explained below.

The wireless interface (for wireless LANs) 401 is used for connection to an access point. The wireless interface (for short-range radio) 402 is used for connection between audio terminals over short-range radio.

The Neighbor Discovery processing unit (execution/response unit) 403 has a function of finding an audio terminal present in the neighborhood by Neighbor Discovery through the wireless interface (for short-range radio) 402 and a function of responding to Neighbor Discovery by another audio terminal. A response to Neighbor Discovery is made by sending communication information including the call status (whether it is busy with a call) of the audio terminal 400, a packetization period, and a wireless transmission rate to an audio terminal having performed Neighbor Discovery.

The joining destination selection unit 404 has a function of, if a plurality of audio terminals which are candidates for a joining destination are found as a result of Neighbor Discovery, selecting ones which are busy with voice calls, selecting ones of the selected audio terminals which minimize occupancy time of wireless transmission, and selecting one of the selected audio terminals which reduces an audio delay at the time of joining on the basis of information including their wireless transmission rates and packetization periods. More specifically, the joining destination selection unit 404 has a function of selecting one with the highest wireless transmission rate if the plurality of audio terminals found are busy with calls and selecting one with the shortest packetization period as a joining destination if a plurality of the audio terminals has the highest wireless transmission rate.

The connection request unit 405 has a function of sending a joining request to a selected joining destination, a function of inquiring of the resource manager 350 whether joining is permitted upon receipt of a joining request from another audio terminal, a function of asking an access point to register a joining source and joining destination upon receipt of an OK (affirmative response) from the resource manager in response to the inquiry about whether joining is permitted, and a function of sending the result of the inquiry about whether joining is permitted to the joining source.

The joining processing unit 406 has a function of merging a packet received from an audio terminal as a joining source with a packet which the audio terminal 400 is to send and sending the merged packet and a function of splitting a merged packet received from an access point into packets and sending one addressed to a joining source to the joining source. Information on whether a packet is a joined packet is described in a header field of the top one of merged packets.

The packet communication unit 407 has the following functions in addition to a regular packet communication function. One of the functions is to send a packet to be merged at a joining destination to a joining destination by the wireless interface (for short-range radio) 402 when the joining destination permits joining. Another function is to continue packet communication by regular packet communication, i.e., packet communication through the wireless interface (for wireless LANs) 401 instead of joining communication if a call in the joining destination ends and the resource manager permits a joining source to communicate with an access point directly.

The audio application unit 408 has a VoIP (Voice over Internet Protocol) function that is to send and receive audio data using a TCP/IP network such as the Internet or an intranet. For example, the audio application unit 408 has the functions of internal phones using an intra-office LAN, the Internet, and the like.

Figure 8:
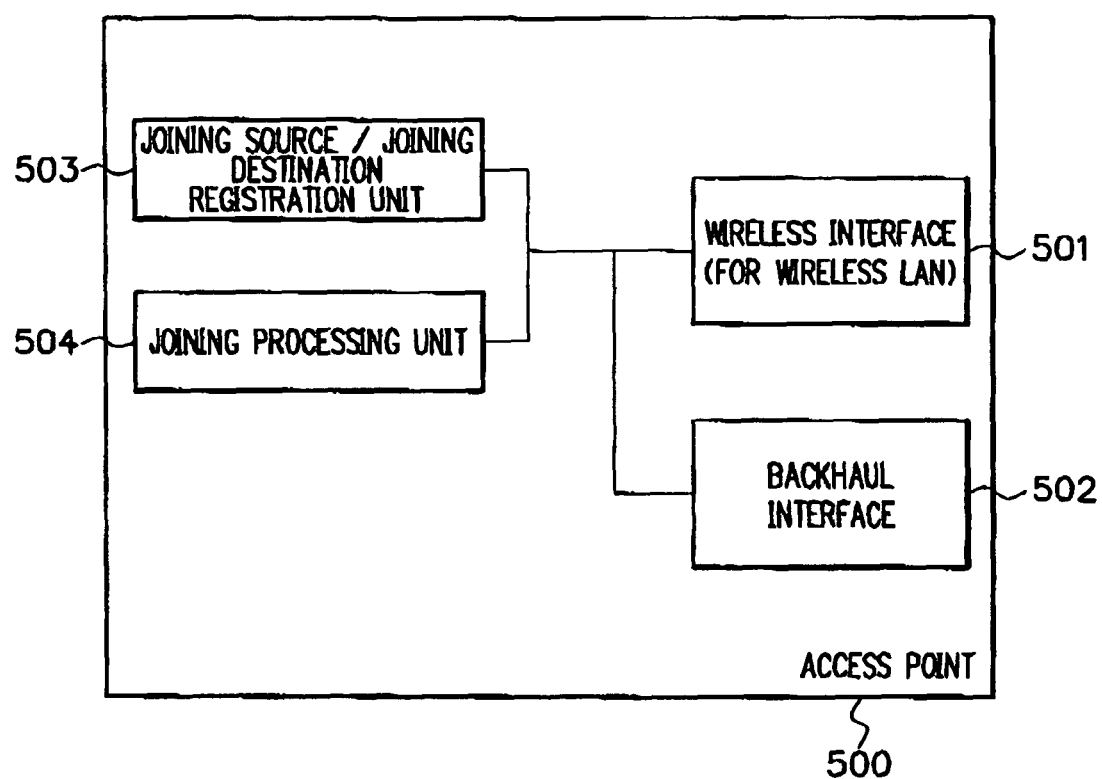
FIG. 8 is a diagram (of the configuration of an access point) for explaining the best mode for carrying out the present invention.

FIG. 8 is a diagram showing the configuration of an access point 500. The configuration and functions of the access point 500 will be explained with reference to FIG. 8.

The access point 500 has a wireless interface 501 for wireless LANs, a wireless interface (backhaul interface) 502 on a backhaul side, a joining source/joining destination registration unit 503, and a joining processing unit 504. The functions and operations of the units will be explained below.

The wireless interface (for wireless LANs) 501 is used for connection to audio terminals. The backhaul interface 502 is used for connection to a backhaul.

The joining source/joining destination registration unit 503 has a function of registering the MAC addresses of a pair of audio terminals, a joining source and joining destination in a table.

The joining processing unit 504 has a function of splitting a merged packet received from an audio terminal into packets for respective audio terminals. The joining processing unit 504 also has a function of holding a packet addressed to a joining source received from a backhaul side through the backhaul interface 502, merging the packet with a packet addressed to a joining destination, and sending the merged packet through the wireless interface (for wireless LANs) 501.

The resource manager 350 has a function of deciding whether to keep the bandwidth within acceptable limit on the basis of the packet lengths of a specific pair of audio terminals, an audio terminal as a joining destination and one as a joining source in response to an inquiry from an audio terminal, and providing determination information on whether joining of packets of the pair is permitted or the determination result to the audio terminal. Incidentally, in the present invention, any determination method may be used.

(Explanation of Operation)

The procedure for packet joining operation of this embodiment will be explained next.

FIGS. 9, 10, 11, 12, 13, 14, 15, and 16 are flowcharts of the procedures of a packet joining method.

Figure 9:
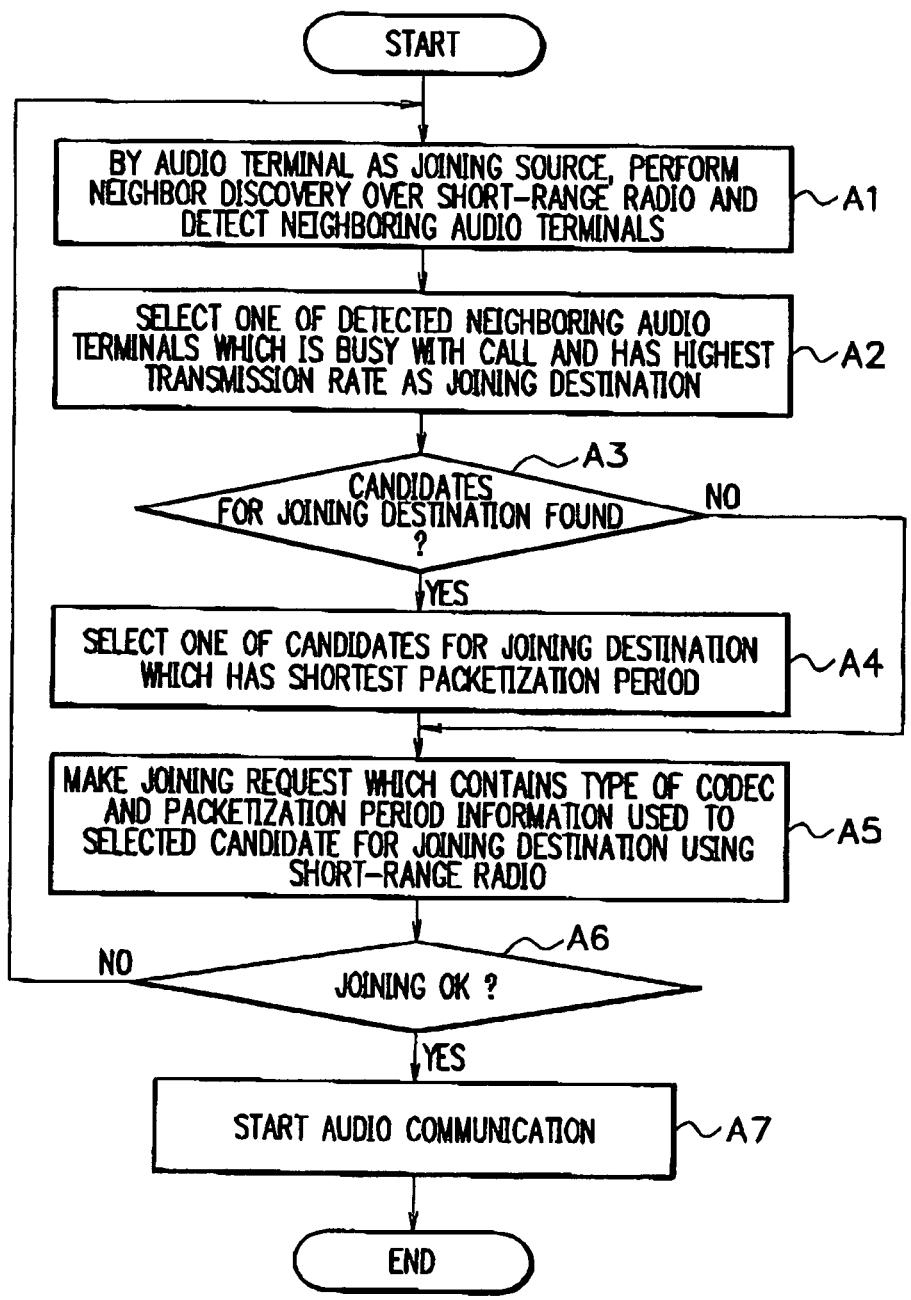
FIG. 9 is a flowchart for explaining the best mode for carrying out the present invention.

FIG. 9 is a chart showing the flow of the operation of a terminal as a joining source of selecting a terminal as a joining destination by Neighbor Discovery.

An audio terminal that desires joining (one as a joining source) makes access through Neighbor Discovery over short-range radio and detects neighboring audio terminals (A1 in FIG. 9). The audio terminal as the joining source having detected the neighboring audio terminals by Neighbor Discovery selects one which is busy with a call and has the highest wireless transmission rate as an audio terminal as a joining destination on the basis of information including the call statuses and wireless transmission rates of the neighboring audio terminals obtained by Neighbor Discovery (A2 in FIG. 9). If there are a plurality of candidates for the joining destination with the highest wireless transmission rate (A3 in FIG. 9), the audio terminal as the joining source selects one with the shortest packetization period from the plurality of candidates for the joining destination. The audio terminal as the joining source makes a joining request to the selected candidate for the joining destination using short-range radio (A5 in FIG. 9). If the result of the joining request shows that joining is OK (A6 in FIG. 9), audio communication starts (A7 in FIG. 9).

Figure 10:
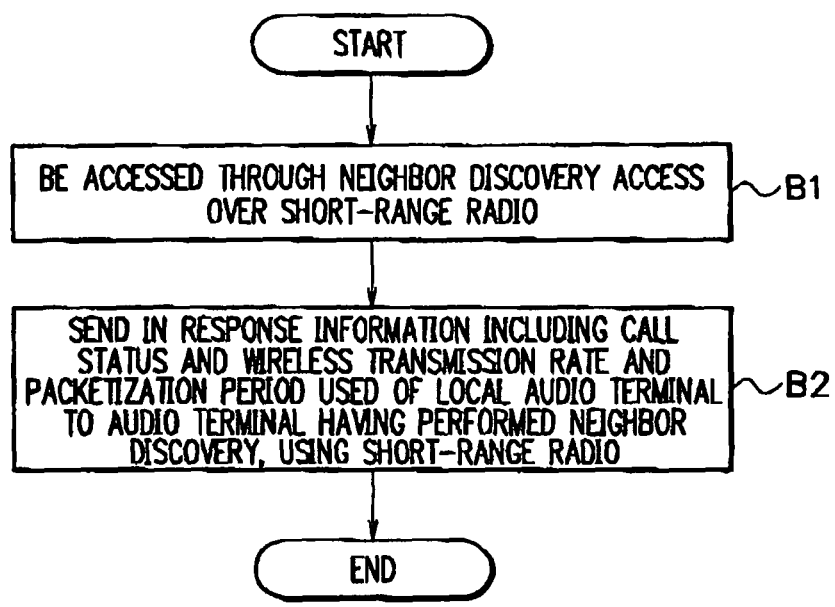
FIG. 10 is a flowchart for explaining the best mode for carrying out the present invention.

FIG. 10 is a chart showing the flow of the response operation of an audio terminal having been accessed through Neighbor Discovery.

An audio terminal having been accessed through Neighbor Discovery over short-range radio (B1 in FIG. 10) responds to the access by sending information including the call status, the wireless transmission rate for a wireless LAN, and the packetization period of the audio terminal to an audio terminal having performed Neighbor Discovery, using short-range radio (B2 in FIG. 10).

Figure 11:
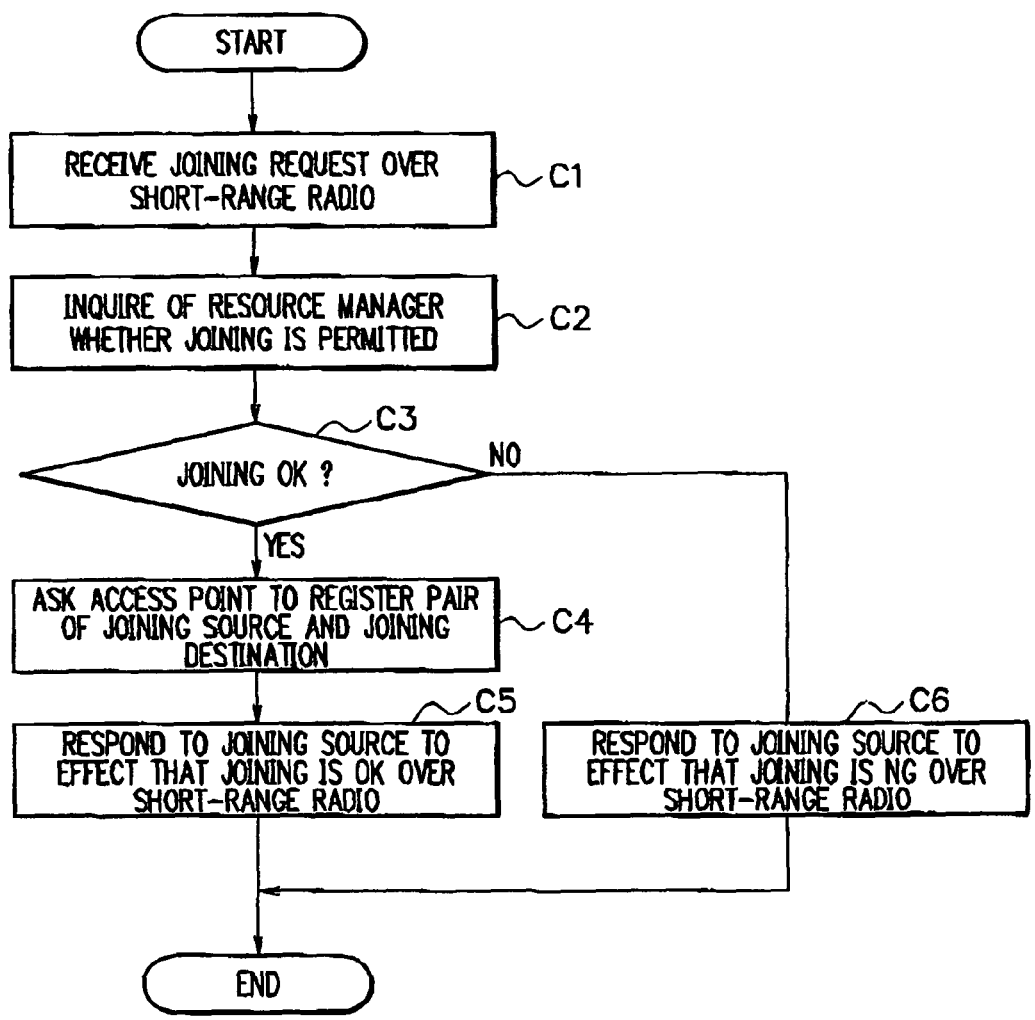
FIG. 11 is a flowchart for explaining the best mode for carrying out the present invention.

FIG. 11 is a chart showing the flow of the operation of an audio terminal as a joining destination of processing a joining request received from an audio terminal as a joining source over short-range radio.

An audio terminal having received a joining request over short-range radio (C1 in FIG. 11) inquires of the resource manager whether joining is permitted (C2 in FIG. 11). If the result of the inquiry shows that joining is OK (joining OK) (C3 in FIG. 11), the audio terminal asks an access point to register as a pair an audio terminal (a joining source) and the audio terminal (a joining destination) (C4 in FIG. 11). The audio terminal responds to the audio terminal as the joining source to the effect that joining is OK over short-range radio (C5 in FIG. 11). On the other hand, if the result shows that joining is NG (negative response joining NG) (C3 in FIG. 11), the audio terminal responds to the audio terminal as the joining source to the effect that joining is NG over short-range radio.

Figure 12:
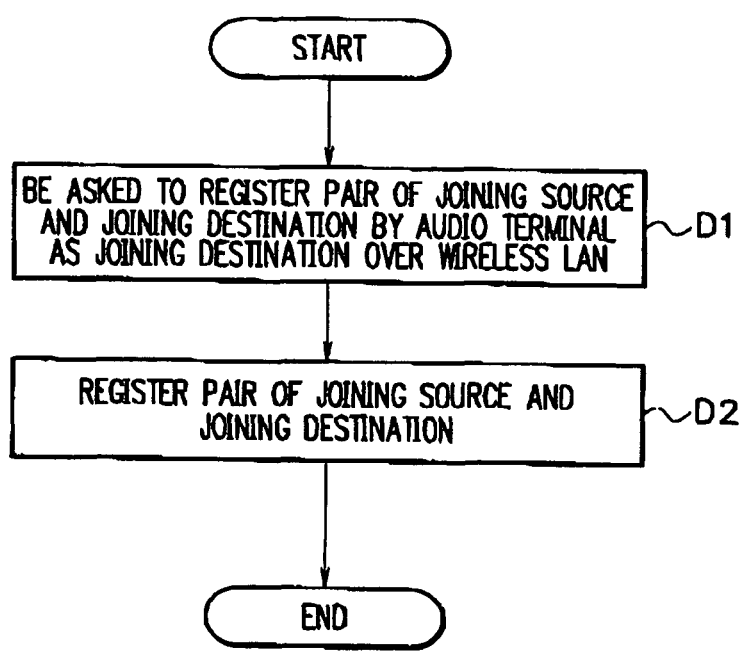
FIG. 12 is a flowchart for explaining the best mode for carrying out the present invention.

FIG. 12 is a chart showing the flow of the operation of an access point of processing a request for registration of the pair of MAC addresses of a joining source and joining destination received from an audio terminal as the joining destination.

When an access point is asked by an audio terminal as a joining destination to register the MAC addresses of a joining source and the joining destination over a wireless LAN (D1 in FIG. 12), the access point registers as a pair the MAC addresses of the joining source and joining destination (D2 in FIG. 12).

Figure 13:
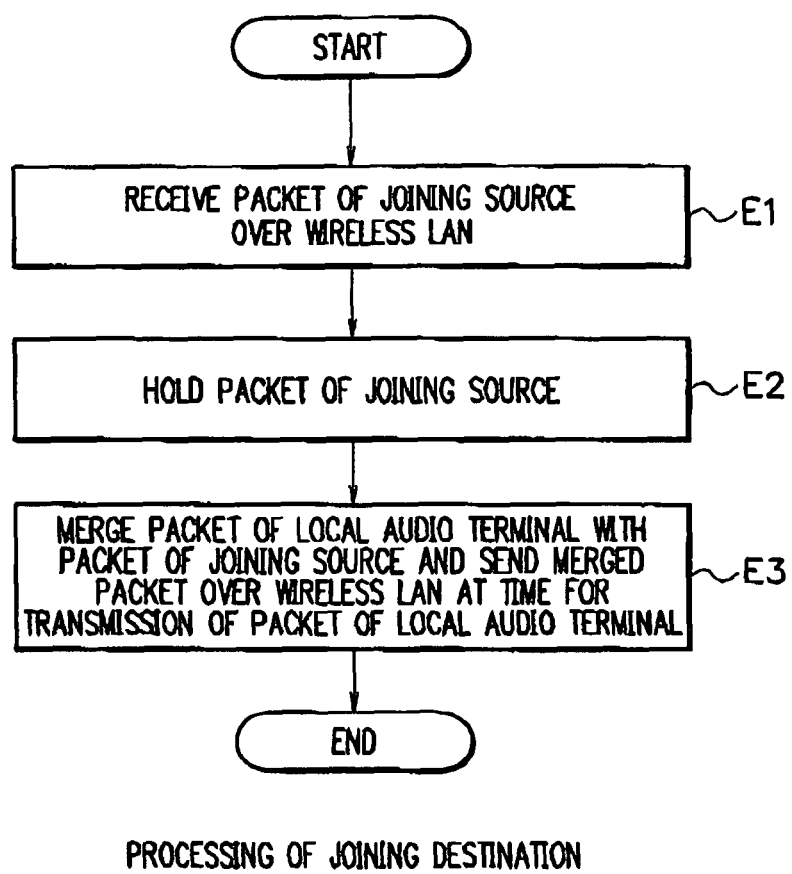
FIG. 13 is a flowchart for explaining the best mode for carrying out the present invention.
Figure 14:
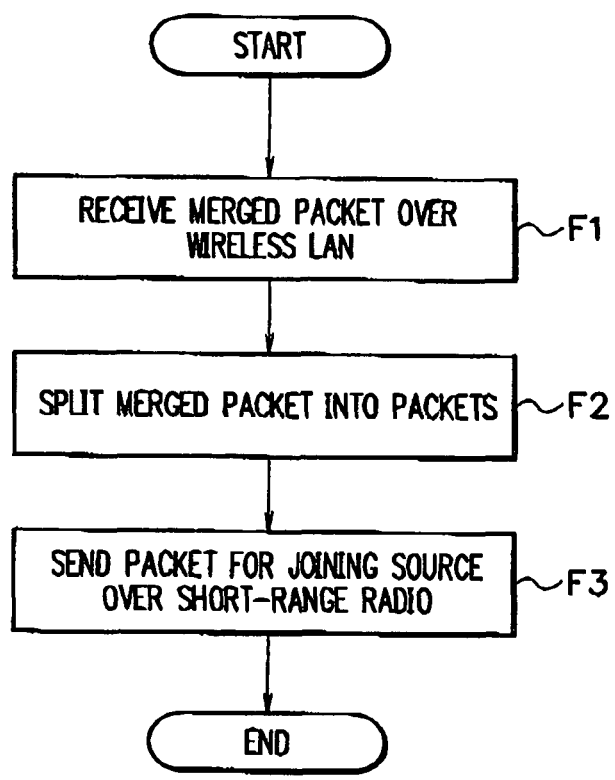
FIG. 14 is a flowchart for explaining the best mode for carrying out the present invention.

FIGS. 13 and 14 are charts showing the flows of the operation of joining processing of an audio terminal as a joining destination.

On receipt of a packet of a joining source over short-range radio (E1 in FIG. 13), an audio terminal as a joining destination temporarily holds the packet (E2 in FIG. 13). The audio terminal merges the packet with its own packet and sends the merged packet over a wireless LAN at a time for transmission of its packet (E3 in FIG. 13).

On receipt of a merged packet that is identified by its MAC header over the wireless LAN (F1 in FIG. 14), the audio terminal as the joining destination splits the merged packet into its own packet and a packet for an audio terminal as the joining source (F2 in FIG. 14). Simultaneously with receipt of the packet for the audio terminal itself, the audio terminal sends the packet for the audio terminal as the joining source to short-range radio (F3 in FIG. 14).

Figure 15:
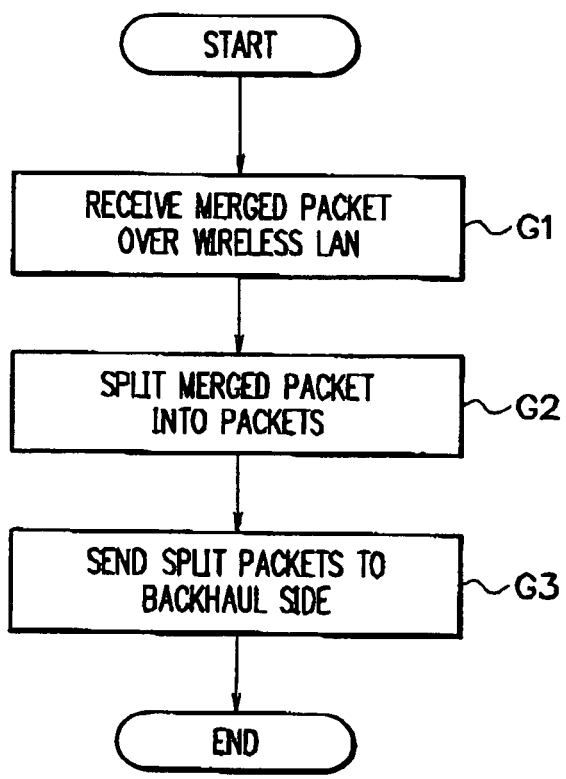
FIG. 15 is a flowchart for explaining the best mode for carrying out the present invention.
Figure 16:
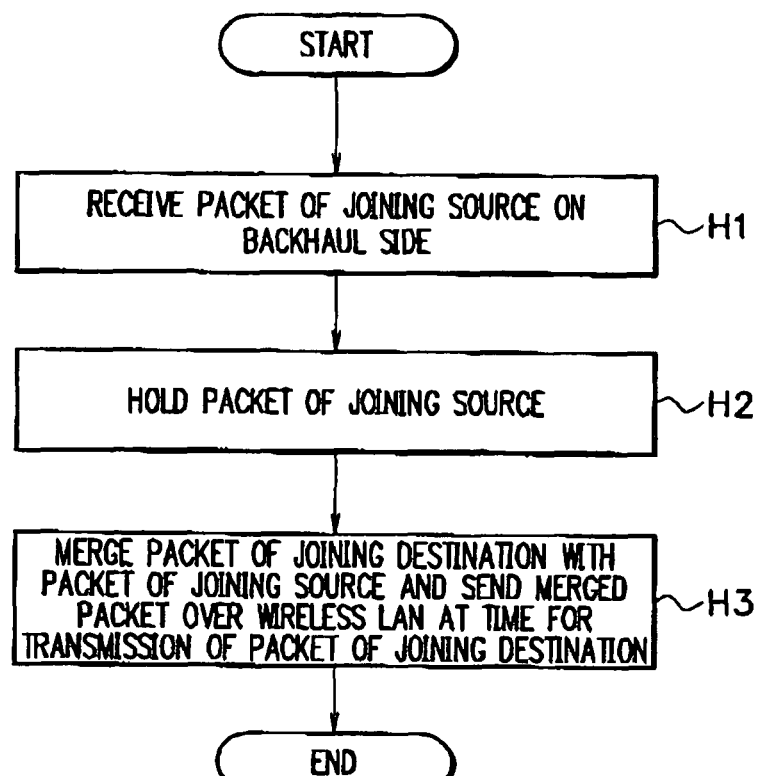
FIG. 16 is a flowchart for explaining the best mode for carrying out the present invention.

FIGS. 15 and 16 are charts showing the flows of the operation of joining processing of an access point.

On receipt of a merged packet from a wireless LAN (G1 in FIG. 15), an access point splits the merged packet into packets (G2 in FIG. 15). The access point sends the split packets to a backhaul side (G3 in FIG. 15). On receipt of a packet of an audio terminal as a joining source from the backhaul side (H1 in FIG. 16), the access point holds the packet (H2 in FIG. 16).

On receipt of a packet of an audio terminal as a joining destination, the access point merges the packet of the audio terminal as the joining source with the packet of the audio terminal as the joining destination and sends the merged packet over the wireless LAN at a time for transmission of the packet of the joining destination (H3 in FIG. 16).

The packet of the audio terminal as the joining source and the packet of the audio terminal as the joining destination are identified using a table of the access point in which the pair of MAC addresses of the joining source and joining destination are registered, as in the flowcharts of FIGS. 11 and 12.

Short-range radio and a wireless LAN to be connected to a wireless interface of this embodiment are examples of wireless communication means. Other types of wireless communication may be used instead.

First Embodiment

An embodiment of the present invention will be explained using FIG. 6. A network comprises an access point 300, a resource manager 350, an audio terminal 301, an audio terminal 302, an audio terminal 303, and an audio terminal 304, similarly to the above-described embodiment.

Audio terminals which are performing audio communication while connecting to the access point 300 are the audio terminal 301, audio terminal 302, and audio terminal 303. Assume that the audio terminal 304 is denied audio communication over a wireless LAN by the resource manager 350, and a call from the audio terminal 304 is lost.

The audio terminal 304 performs Neighbor Discovery using short-range radio (A1 in FIG. 9). An audio terminal having been accessed through Neighbor Discovery (B1 in FIG. 10) sends in response information including the call status, wireless transmission rate, and packetization period of the audio terminal to the audio terminal 304 having performed Neighbor Discovery, using short-range radio (B2 in FIG. 10). As a result of Neighbor Discovery, the audio terminals 301, 302, and 303 are detected, and their pieces of communication information are acquired.

FIGS. 17, 18, and 19 show the respective pieces of communication information, the call statuses, transmission rates, and packetization periods of the audio terminals 901, 302, and 303.

The audio terminal 304 selects one which is busy with a call and has the highest transmission rate as an audio terminal as a joining destination on the basis of the result of Neighbor Discovery (A2 in FIG. 9). In this example, any of the audio terminals is busy with a call. The wireless transmission rate of the audio terminal 301 is 1 Mbps, and those of the other two audio terminals are 11 Mbps. Accordingly, the audio terminal 304 selects the audio terminals 302 and 303 as candidates for the joining destination.

Since, the plurality of audio terminals is selected as candidates for the audio terminal as the joining destination at this time (A3 in FIG. 9), the audio terminal 304 selects one with the shortest packetization period (A4 in FIG. 9). The audio terminal 302 is finally selected as the joining destination.

The audio terminal 304 makes a joining request to the selected audio terminal 302 as the joining destination using short-range radio (A5 in FIG. 9). The joining request contains information including the type of a codec and a packetization period used.

The audio terminal 302 having received the joining request (C1 in FIG. 11) inquires of the resource manager 350 whether joining is permitted (C2 in FIG. 11). Assume here that the determination result obtained from the resource manager 350 shows that joining is OK. The audio terminal 302 having received the determination result from the resource manager 350 (C3 in FIG. 11) asks the access point 300 to register the MAC addresses of the joining source (i.e., the audio terminal 304) and the joining destination (i.e., the audio terminal 302) (C4 in FIG. 11). The access point 300 having been asked for registration (D1 in FIG. 12) registers the pair of addresses of the joining source and joining destination (D2 in FIG. 12).

The audio terminal 302 having asked the access point 300 to register the pair of addresses of the joining source and joining destination responds to the audio terminal 304 as the joining source to the effect that joining is OK over short-range radio (C5 in FIG. 11).

On receipt of the response indicating that joining is OK from the audio terminal 302, the audio terminal 304 starts audio communication (A7 in FIG. 9).

The audio terminal 302 having received a voice packet from the audio terminal 304 as the joining source over short-range radio (E1 in FIG. 13) temporarily holds the packet (E2 in FIG. 13). The audio terminal 302 merges a voice packet with the voice packet of the joining source and sends the merged packet over the wireless LAN at a time for transmission of its own packet (E3 in FIG. 13). An identifier indicating joining is attached to the MAC header of the merged packet.

On receipt of the merged packet from the wireless LAN (G1 in FIG. 15), the access point 300 splits the merged packet into packets (G2 in FIG. 15) and sends the packets to a backhaul side (G3 in FIG. 15).

The access point 300 having received a packet addressed to the from the backhaul side (H1 in FIG. 16) holds the packet (H2 in FIG. 16). Whether a packet is addressed to the joining source is determined on the basis of registered information, the pair of MAC addresses of the joining source and joining destination. On receipt of a packet addressed to the audio terminal 302 as the joining destination, the access point 300 merges the packet addressed to the audio terminal 302 with the packet addressed to the audio terminal 304 and sends the merged packet to the wireless LAN (H3 in FIG. 16).

On receipt of the merged packet from the wireless LAN (F1 in FIG. 14), the audio terminal 302 splits the merged packet into packets (F2 in FIG. 14) and sends one addressed to the audio terminal 304 to the audio terminal 304 over short-range radio (F3 in FIG. 14).

With the above-described operation, the audio terminal 304 can establish communication through the access point 300 with the aid of the audio terminal 302 as the joining destination. This prevents unnecessary traffic flow in short-range radio, shortens occupancy time of radio bandwidth at the time of joining voice packets, and reduces waiting delay time at the time of joining.

Second Embodiment

In operation as described in the above embodiment, when a call ends, an audio terminal 302 permitting a packet from an audio terminal 304 to join asks an access point 300 to delete registered information of the addresses of the joining source and joining destination and at the same time asks a resource manager 350 to release a bandwidth. At this time, the resource manager 350 can permit the audio terminal 304 as the joining source to preferentially use the bandwidth. The audio terminal 304 as the joining source detects the end of the call in the audio terminal 302 or is permitted to use the bandwidth by a resource manager. With this operation, the audio terminal 304 can be configured to continue a call by communicating an access point 300 directly by regular packet communication through a wireless LAN or by packet joining through another Neighbor Discovery process.

According to this embodiment, even if the audio terminal 302 as the joining destination ends a call, the audio terminal 304 as the joining source can continue audio communication over a wireless LAN.

Third Embodiment

An embodiment which performs a packet joining process of the present invention by a computer program will be explained next.

FIG. 20 is a diagram showing the configuration of an audio terminal of this embodiment. The audio terminal comprises a wireless interface (for wireless LANs) 601, a wireless interface (for short-range radio) 602, an operation unit 609, a display unit 610, an audio I/O unit 611, a storage unit 612, and a control unit (CPU) 600. A processing program for packet joining communication and the like of the present embodiment is stored in the storage unit 612. The processing program is read from the storage unit 612 by the control unit (CPU) 600 to control the operation of the control unit (CPU) 600.

In this embodiment, the procedure for packet joining communication starting from Neighbor Discovery can be started by a user's inputting the address, telephone number, or the like of a party through the operation unit 609 and display unit 610. After connection to the party, a call between the audio terminals can be reached through the audio I/O unit 611. In order to realize the above operation, the control unit (CPU) 600 executes the processing program to implement a Neighbor Discovery processing function 603, a joining destination selection function 604, a connection request function 605, a joining processing function 606, a packet communication function 607, and an audio application function 608.

The functions implemented by the processing program are the same as those of the Neighbor Discovery processing unit (execution/response unit) 403, joining destination selection unit 404, connection request unit 405, joining processing unit 406, packet communication unit 407, and audio application unit 408 shown in FIG. 7. Audio terminals as a joining source and joining destination can perform the procedures of the operation flowcharts shown in FIGS. 9, 10, 11, and 13. An access point or the like can comprise conventional means and can perform the procedures of the operation flowchart shown in FIGS. 12, 15, and 16.

The present invention can be used for a purpose such as reducing lost calls in VoIP of a hotspot system or the like.

As set forth above, According to the present invention, an audio terminal as a packet joining source finds neighboring audio terminals as candidates for a packet joining destination by Neighbor Discovery, acquires call information including whether the audio terminals are busy with calls. The audio terminal as the packet joining source selects one of the audio terminals which is busy with a call as an audio terminal as the joining destination and performs packet joining communication through the audio terminal as the joining destination. This prevents unnecessary traffic flow in short-range radio and makes it possible to increase the utilization efficiency of a radio bandwidth.

Also, the audio terminal as the packet joining source acquires not only call status information but also wireless transmission rate information as the call information of the neighboring audio terminals found by Neighbor Discovery. The audio terminal as the packet joining source selects one which is busy with a voice call and has a high wireless transmission rate from the list of neighboring audio terminals found as the joining destination and performs packet joining communication. This makes it possible to shorten occupancy time of radio bandwidth at the time of voice packet joining.

Additionally, an audio terminal which desires voice packet joining acquires not only call status and wireless transmission rate information but also packetization period information as call information of an audio terminal. The audio terminal requests joining of one as a joining destination of a list of neighboring audio terminals that has a short packetization period used on the basis of the acquired information and performs packet joining communication. This makes it possible to reduce waiting delay time at the time of joining.

Moreover, an audio terminal of the present invention can be allocated a new radio bandwidth when an audio terminal as a joining destination ends a call. Accordingly, even when the audio terminal as the joining destination ends communication by packet joining, the audio terminal of the present invention can continue the communication.

What is claimed is:

1. A packet joining method for an audio terminal in a plurality of audio terminals in a wireless communication Internet connection service through an access point, comprising:

performing Neighbor Discovery by a joining source audio terminal in the plurality of audio terminals over short-range radio, detecting a candidate audio terminal in the plurality of audio terminals that is a candidate for a joining destination, and acquiring communication information of the detected candidate audio terminal;

sending, in response to Neighbor Discovery by the joining source audio terminal which desires packet joining communication, communication information of a local audio terminal;

inquiring of a resource manager of a network, in response to a joining request from the joining source audio terminal, whether packet joining is permitted and sending a determination result to the joining source audio terminal having made the joining request;

if a plurality of candidate audio terminals are detected in said detecting the candidate audio terminal, then selecting a joining destination audio terminal of the plurality of candidate audio terminals which is busy with a call, the call being other than a call from the joining source audio terminal performing Neighbor Discovery, as the joining destination on the basis of the communication information of the candidate audio terminal detected;

requesting joining of the joining destination audio terminal selected as the joining destination;

receiving information on permission for joining from the joining destination audio terminal and sending a packet to be joined to the joining destination audio terminal;

receiving the packet from the joining source audio terminal having been permitted joining, merging the packet from the joining source audio terminal with a packet of the local audio terminal, and sending the merged packet as a joined packet; and receiving an other joined packet, splitting the other joined packet into a plurality of packets, and outputting the plurality of packets to the local audio terminal and the joining source audio terminal.

2. The packet joining method according to claim 1, further comprising selecting, if a plurality of the candidate audio terminals which are busy with respective calls are selected in said selecting said candidate audio terminal, a terminal of the plurality of candidate audio terminals that has a highest wireless transmission rate as the joining destination.

3. The packet joining method according to claim 2, further comprising selecting, if a plurality of candidate audio terminals having the highest wireless transmission rate are selected in said selecting the terminal that has the highest wireless transmission rate, a terminal of the plurality of candidate audio terminals that has a shortest packetization period as the joining destination.

4. The packet joining method according to claim 1, further comprising:

allocating a radio bandwidth for continuation of communication if the call ends in the joining destination audio terminal selected as the joining destination.

5. The packet joining method according to claim 1, wherein the communication information comprises a call status, a packetization period and a wireless transmission rate of the candidate audio terminal.

6. The packet joining method according to claim 1, wherein the joining destination audio terminal selected as a joining destination, upon receiving the joining request, communicates with the resource manager to determine if joining is allowed.

7. The packet joining method according to claim 1, wherein the call comprises a voice call.

8. The packet joining method according to claim 1, wherein data associated with the call comprises a voice packet.

9. A non-transitory computer readable medium which tangibly embodies a computer program for packet joining for an audio terminal in a wireless communication Internet connection service through an access point, the computer program causing a control unit of an audio terminal to execute:

performing Neighbor Discovery over short-range radio, detecting a candidate audio terminal that is a candidate for a joining destination, and acquiring communication information of the candidate audio terminal;

sending, in response to Neighbor Discovery by a joining source audio terminal which desires packet joining communication, communication information of a local audio terminal;

inquiring of a resource manager of a network, in response to a joining request from the joining source audio terminal, whether packet joining is permitted and sending a determination result to the joining source audio terminal having made the joining request;

if a plurality of candidate audio terminals are detected in said detecting the candidate audio terminal, then selecting a joining destination audio terminal of the plurality of candidate audio terminals that is busy with a call, the call being other than a call from the joining source audio terminal performing Neighbor Discovery, as the joining destination on the basis of the communication information of the candidate audio terminal detected in the Neighbor Discovery process;

a process of requesting joining of the joining destination audio terminal selected as the joining destination and a joining communication process of receiving information on permission for joining from the joining destination audio terminal and sending a packet to be joined to the joining destination audio terminal;

receiving the packet from the joining source audio terminal having been permitted joining, merging the packet from the joining source audio terminal with a packet of the local audio terminal, and sending the merged packet as a joined packet; and receiving an other joined packet, splitting the other joined packet into a plurality of packets, and outputting the plurality of packets to the local audio terminal and the joining source audio terminal.

10. The medium according to claim 9, wherein the computer program causes the control unit of the joining source audio terminal to further execute a process of, if a plurality of the candidate audio terminals which are busy with respective calls are selected in said selecting said candidate audio terminal, selecting one of the plurality of candidate audio terminals that has a highest wireless transmission rate as the joining destination.

11. The medium according to claim 10, wherein the computer program causes the control unit of the joining source audio terminal to further execute a selection process of if a plurality of candidate audio terminals having the highest wireless transmission rate are selected in said selecting one of the plurality of candidate audio terminals that has the highest wireless transmission rate, selecting a terminal of the plurality of candidate audio terminals that has a shortest packetization period as the joining destination.

12. The medium for packet joining according to claim 9, wherein the computer program causes the control unit of the joining source audio terminal to further execute an allocation process of being allocated a radio bandwidth for continuation of communication if the call ends in the joining destination audio terminal selected as the joining destination.

13. An audio terminal for packet joining in a wireless communication Internet connection service including a plurality of audio terminals through an access point, comprising:
- a Neighbor Discovery processing unit which detects a neighboring candidate audio terminal that is a candidate for a joining destination and acquires communication information of the detected candidate audio terminal by Neighbor Discovery over short-range radio;
- a joining destination selection unit that, if a plurality of candidate audio terminals are detected by said Neighbor Discovery processing unit, selects a joining destination audio terminal of the plurality of candidate audio terminals that is busy with a call, the call being from an audio terminal other than a joining source audio terminal that desires packet joining, as the joining destination on the basis of the communication information of the audio terminal detected by said Neighbor Discovery processing unit;
- a joining request unit that requests joining of the joining destination audio terminal selected as the joining destination; and
- a joining processing unit that receives information on permission for joining from the joining destination audio terminal and sends a packet to be joined to the joining destination audio terminal, wherein said Neighbor Discovery processing unit has a joining response function of, in response to Neighbor Discovery by the joining source audio terminal that desires packet joining communication, sending communication information of a local audio terminal and, in response to a joining request from the joining source audio terminal, inquiring of a resource manager of a network whether packet joining is permitted and sending a determination result to the joining source audio terminal having made the joining request, and wherein said joining processing unit has a function of receiving the packet from the joining source audio terminal having been permitted joining, merging the packet from the joining source audio terminal with a packet of the local audio terminal, and sending the merged packet as a joined packet and a function of receiving an other joined packet, splitting the joined packet into a plurality of packets, and outputting the plurality of packets to the local audio terminal and the joining source audio terminal.

14. The audio terminal according to claim 13, wherein if a plurality of candidate audio terminals detected by said Neighbor Discovery processing unit are busy with respective calls, said joining destination selection unit selects a terminal of the plurality of candidate audio terminals which has a highest wireless transmission rate as the joining destination.

15. The audio terminal according to claim 14, wherein if a plurality of candidate audio terminals have the highest wireless transmission rate, said joining destination selection unit selects a terminal of the plurality of candidate audio terminals that has a shortest packetization period as the joining destination.

16. The audio terminal according to claim 13, further comprising a packet communication unit that continues packet communication by being allocated a radio bandwidth for continuation of communication instead of packet joining communication if the call ends in the laming destination audio terminal selected as the joining destination.

* * * * *